(12) United States Patent
Bueker et al.

(10) Patent No.: US 9,504,262 B2
(45) Date of Patent: Nov. 29, 2016

(54) COLLAGEN CONCENTRATE, USE THEREOF AND ALSO PROCESS FOR PRODUCTION THEREOF

(75) Inventors: Marion Bueker, Singhofen (DE); Gert Bueker, Singhofen (DE); Gerhard Grolig, Moerfelden-Walldorf (DE)

(73) Assignee: Kalle GmbH, Wiesbaden (DE)

( * ) Notice: Subject to any disclaimer, the term of this patent is extended or adjusted under 35 U.S.C. 154(b) by 1075 days.

(21) Appl. No.: 12/334,599

(22) Filed: Dec. 15, 2008

(65) Prior Publication Data

US 2009/0162502 A1 Jun. 25, 2009

(30) Foreign Application Priority Data

Dec. 19, 2007 (DE) .................. 10 2007 061 710

(51) Int. Cl.
| | | |
|---|---|---|
| *A22C 13/00* | (2006.01) | |
| *A23J 1/00* | (2006.01) | |
| *A23J 3/00* | (2006.01) | |

(52) U.S. Cl.
CPC ............ *A22C 13/0013* (2013.01); *A23J 1/002* (2013.01); *A23J 3/04* (2013.01); *A22C 2013/002* (2013.01); *A22C 2013/0023* (2013.01)

(58) Field of Classification Search
CPC .................. A22C 2013/0023; A22C 13/0013; A22C 2013/0046; A23J 1/002; A23J 3/04; A61L 27/24; A61L 1/3175; C12N 2533/54; A23V 2250/5422
USPC ........ 426/105, 277, 106, 138, 576; 428/34.8, 428/34.3
See application file for complete search history.

(56) References Cited

U.S. PATENT DOCUMENTS

| | | |
|---|---|---|
| 2,114,220 A | 4/1938 | Hans Freudenberg et al. |
| 3,178,301 A | 4/1965 | Arthur Veis et al. |
| 3,231,463 A | 1/1966 | Roger de la Burde et al. |
| 3,530,037 A | 9/1970 | Tomio Nishihara |
| 3,535,125 A | 10/1970 | Fagan |
| 3,694,234 A | 9/1972 | Jones et al. |
| 3,782,977 A | 1/1974 | Henderson et al. |
| 3,821,429 A | 6/1974 | Jolly et al. |
| 4,185,011 A | 1/1980 | Eckmayer et al. |
| 4,615,889 A | 10/1986 | Fu Lu et al. |
| 6,016,862 A | 1/2000 | Herreid |
| 6,153,234 A | 11/2000 | Kobussen et al. |

FOREIGN PATENT DOCUMENTS

| | | |
|---|---|---|
| DE | 23 36 561 B2 | 7/1973 |
| DE | 23 14 767 B2 | 3/1978 |
| EP | 0 244 661 | 11/1987 |
| EP | 0 821 878 B1 | 1/2002 |
| GB | 1190879 B2 | 5/1970 |
| WO | WO 2006/051278 A1 | 5/2006 |

OTHER PUBLICATIONS

B.A. Lang, G. Effenberger, Würsthullen—Kunstdarrn "Sausage casings, artificial skin", Deutscher Fachverlag, Frankfurt am Main, 3rd Edition [2006] pp. 58-63.

*Primary Examiner* — Vera Stulii
(74) *Attorney, Agent, or Firm* — ProPat, L.L.C.

(57) ABSTRACT

A film-forming collagen concentrate is provided containing at least 18% by weight dry matter. At least 50% by weight of the protein of a homogeneous suspension produced from the concentrate in a 0.15 molar aqueous sodium dihydrogenphosphate buffer having a pH of 7 and a calculated dry matter fraction of 0.5% by weight may be separated as sediment by 15 min centrifugation at 1780 RFC and 15° C. A process is also disclosed for producing a collagen-concentrate-containing food casing that includes (a) producing an aqueous collagen mass; (b) concentrating the aqueous collagen mass until it has a solids fraction of 18% by weight or more; (c) admixing the concentrate with dilute acid to obtain a (co)extrudable or castable collagen mass; (d) coextruding or casting the collagen mass to from a casing; (e) solidifying the casing and, optionally, (f) drying the casing.

24 Claims, No Drawings

COLLAGEN CONCENTRATE, USE THEREOF AND ALSO PROCESS FOR PRODUCTION THEREOF

CROSS-REFERENCE TO RELATED APPLICATIONS

This application claims priority to German Patent Application No. 10 2007 061 710.2 filed Dec. 19, 2007 which is hereby incorporated herein by reference in its entirety.

FIELD OF THE INVENTION

The invention relates to a collagen concentrate and also to its use in the production of artificial, preferably edible, food casings.

BACKGROUND OF THE INVENTION

Collagen is a fibrous protein which is present in rind, cartilage, bones and hide. Currently, 28 different types are known. Under physiological conditions, collagen is insoluble, but can be hydrolyzed by heat, bases or weak acids. If a hydrolyzed collagen is purified, concentrated, sterilized, dried and milled, this produces gelatin, the special property of which, being able to bind considerable quantities of water, makes it widely used in a number of foods and medicaments.

In contrast thereto, collagen hydrolyzate is enzymatically hydrolyzed collagen which is also soluble in water, but, unlike gelatin, is no longer able to bind considerable amounts of water. However, it is readily dispersible and emulsion-stabilizing, which is why it is used in the cosmetics industry just as in the textile and food sectors, for example in the meat product, confectionery and drinks industries. In pharmacy, collagen is used as tableting compound, coating agent and filler.

The later use of the collagen plays a critical role even in the production of the collagen mass. This applies particularly in the use of collagen for sausage casings. The raw material for producing collagen skins (=hide fiber skins), which, depending on the casing thickness can also be suitable for consumption, is obtained from animal hide, preferably cattle hide. From the inside of the unhaired and freshly salted or lightly limed hide, the hide split is separated off (=split off). The resultant "lower split" is first subjected to an alkaline digest at a pH of about 13, for example with aqueous potassium hydroxide or calcium hydroxide. In this process the hide matrix is loosened and becomes more flexible. By adding acid until a pH of below 3.5 is achieved, the digest is ended. The resultant "collagen rinds" are coarsely minced and the minced material can then be forced through a plurality of perforated disks arranged in series, wherein the diameter of the individual holes becomes smaller from disk to disk. In this manner, a collagen paste is obtained which is transferred to large kneaders.

In the production of collagen skins which are not to be stuffed until later with sausage emulsion or another extrudable food, the collagen mass is frequently further mixed with cellulose fibers which give the skins a higher strength. The fraction of cellulose fibers is expediently about 10 to 25% by weight, based on the weight of the collagen. The mass is then extruded through an annular die and the tubular casing formed is subsequently stabilized. In this process use can be made of a dry spinning process or a wet spinning process. In the dry spinning process, a collagen mass having a relatively high content of dry matter is used. As a result, the tube already has sufficient stability directly after extrusion. For this, generally, use is made of an extrusion mass having a fraction of collagen dry matter of about 8 to 15% by weight, in particular of about 9% by weight (per DE 23 14 767, whose United States equivalent is U.S. Pat. No. 4,081,562 and DE 23 36 561, whose United States equivalent is U.S. Pat. No. 4,001,442). Dry-extruded collagen casings in addition, may be shaped under the action of heat. Unlike in the wet spinning process, edible ring skins may also be produced in such a manner. In the wet spinning process, in contrast, the dry matter content in the collagen mass is less. It is generally about 3 to 6% by weight. The mass is extruded in this case into a coagulation bath which contains an aqueous ammonium sulfate or sodium chloride solution and in addition ammonia as coagulating medium (see B. A. Lang, G. Effenberger, Wursthüllen—Kunstdarni [Sausage casings—artificial skin], Deutscher Fachverlag, Frankfurt a. M., 3rd edition [2006] pp. 58-63).

For the production of edible collagen skins, i.e. collagen skins suitable to be consumed as well, conventionally acidified, aqueous collagen masses having a collagen dry matter content of 3 to 6% by weight and about 0.6 to 1.2% by weight of cellulose fibers are used (per U.S. Pat. No. 4,615,889 and EP-B 0 821 878). They must be constantly cooled during storage and transport, in order that the spread of microorganisms causing breakdown is prevented. The longer the time period of the storage and transport is, the greater the additional risk that the acid present in the mass attacks the collagen and chemically destroys it. A further disadvantage is that the mass includes about 95% by weight water, which produces high transport costs based on the value of the collagen fraction. Since a large part of the collagen traded on the world market originates from South America, the transport costs are a significant economic factor. In addition, storage is complex. Refrigerated rooms and refrigerated containers are required.

Alternatively, the hide can be transported dried or salted. The salt, however, must be washed out again before further processing.

In addition, a process is known in which a food, in particular sausage emulsion, is extruded and at the same time a layer of a collagen gel is extruded around the food (per EP 0 618 771 B1). The aqueous collagen gel preferably contains about 4 to 10% by weight of collagen, in addition it can contain further small amounts (0.1 to 2.0% by weight) of cellulose. It preferably has a pH of 1 to 4. In this pH range the collagen gel takes up a particularly large amount of water (90 to 95% by weight). The collagen gel is subsequently crosslinked chemically, for example by a crosslinking agent mixed with the collagen gel, such as glutaraldehyde, glyoxal, liquid smoke, sugar or a mineral tanning agent. Coagulation can also be performed by treatment with a salt solution which removes water from the collagen gel, or by increasing the pH until it is in the isoelectric range of the collagen.

A very similar coextrusion process is disclosed in EP 1 130 978 B1. In this process, an activated-carbon-pretreated, substantially colorless liquid smoke having a pH of 5 to 7 is used for hardening the collagen. In the coextrusion process according to WO 2006/051278, an aqueous salt solution which additionally contains tartaric acid is used, instead of liquid smoke or another crosslinker, for hardening the casing produced from the collagen gel.

In the coextrusion processes, a collagen gel produced by processes known in principle is used. The collagen fibers are in this case comminuted until they form a very fine suspension (WO 2006/051278). Collagen concentrates in conjunction with coextrusion processes are not disclosed.

SUMMARY OF ADVANTAGEOUS EMBODIMENTS OF THE INVENTION

The object was therefore to concentrate a collagen mass in such a manner that the disadvantages described may be compensated for. The concentrate should have a high fraction of dry matter, be storable and transportable without cooling and remain microbiologically stable at room temperature for a period of at least 6 months. In addition, it should be rapidly and readily convertible into an extrudable or coextrudable mass which is suitable in particular for producing edible collagen skins.

DETAILED DESCRIPTION OF ADVANTAGEOUS EMBODIMENTS OF THE INVENTION

The foregoing objects are achieved using a concentrate of a film-forming collagen (hereinafter termed "film-forming collagen concentrate") which is insoluble in water, but is swellable in dilute aqueous acid, for example dilute acetic acid. The protein in the concentrate is comprised predominantly of collagen fibers which are covalently or noncovalently bonded to one another which are visible even with the naked eye. More than 80% by weight of the components of a homogeneous suspension having a dry matter fraction of 0.5% by weight produced from the concentrate may be separated off as sediment by centrifugation.

The invention accordingly relates to a film-forming collagen concentrate which contains at least 18% by weight of collagen dry matter, based on the total weight of the concentrate, wherein at least 50% by weight of the protein of a homogeneous suspension produced from the concentrate in a 0.15 molar aqueous sodium dihydrogenphosphate buffer having a pH of 7 and a (calculated) dry matter fraction of 0.5% by weight may be separated as sediment by 15 min centrifugation at 1780 RFC and 15° C. This shows that the majority of the collagen concentrate comprises high-molecular weight protein.

For determination of the size and weight distribution of the protein, a sample of the concentrate was dissolved or suspended in a 0.15 molar aqueous sodium dihydrogenphosphate buffer (adjusted to pH 7) until the suspension contained 0.5% by weight of collagen dry matter. The suspension was then stirred for 1 h at 500 rpm in a glass beaker at 20° C., wherein a macroscopically homogeneous mass was obtained. The suspension was then centrifuged (1780 RFC; 15° C.; 15 min; (RFC=Relative Force of Centrifugation–dimensionless quantity)). The supernatant was carefully decanted and then fractionally filtered, more precisely first through a sieve cloth having a mesh width of 60 µm, then through a sieve cloth having a mesh width of 1.2 µm. The resultant filtrate was filtered again, this time first through a sieve cloth having a mesh width of 0.45 µm and then of 0.2 µm. Sediment and also filter residues from the individual filtrations were dried (1.5 h each at 40° C., at 60° C. and at 80° C., then 16 h at 101° C.) and weighed. The dry weights of the individual fractions are reported in the exemplary embodiments.

Generally at least 50% by weight of the collagen has a molecular weight so high that it may be separated off by the described centrifugation process. Preferably, at least 60, 65, 70, 75, 80% by weight, 82.5, 85, 87.5, 90 or 92.5% by weight may be separated off.

By centrifugation at 1780 RFC (15° C.; 15 min) and vacuum filtration through a sieve having a mesh width of 60 m, generally at least 60% by weight, preferably at least 75% by weight of the collagen may be separated off. Particularly preferably, this is at least 80% by weight, 85% by weight, 87.5% by weight, 90% by weight, 92.5% by weight or 95% by weight.

The molecular weight distribution may be determined only with restrictions by Size Exclusion Chromatography (SEC) or by gel electrophoresis, in particular by SDS-PAGE gel electrophoresis. Firstly, most proteins have a molecular weight so high that under the action of the electric field they do not migrate through the gel, even if this is a large-pore gel. Such proteins remain at the point of application. In addition, there are virtually no (elongate) proteins having a defined molecular weight which could be used for the calibration. Finally, the treatment with SDS solution (SDS=sodium dodecylsulfate), in particular under the action of heat, causes a denaturation of the protein. In this case the collagen triple helices are in part cleaved into double strands and/or single strands. In the gel electrophoresis, the proteins then have a different molecular weight than in the original material, so that this investigation does not give a reliable result.

The dry matter content in the collagen concentrate is determined in the same manner, i.e. an exactly weighed out amount of the concentrate is heated for 1.5 h in each case at 40° C., at 60° C. and at 80° C., and subsequently heated for 16 h at 101° C. (±1° C.) in a drying cabinet. The material remaining thereafter is termed collagen dry matter. The fraction of dry matter (DM) in the collagen concentrate may be calculated from the weight difference.

From a concentrate which is swollen with dilute acid and thereby diluted (after the dilution about 3 to 5% strength by weight), a detachable film may be produced when it is applied as a thin layer (about 1 mm) to a smooth surface, for example a glass plate, and subsequently treated with a saturated aqueous NaCl solution at room temperature (about 15 min). The film is self-supporting even before drying. This film comprises individual fibers which need not be covalently bound to one another, but are generally bound to one another by hydrogen bonds or ionic bonds.

Preferably, the collagen concentrate comprises essentially macroscopically visible collagen fibers, i.e. collagen fibers visible with the naked eye. The mean length of the collagen fiber is generally about 3 to 30 mm, preferably 5 to 25 mm, particularly preferably 7.5 to 20 mm.

The concentrate preferably contains 25 to 95% by weight, particularly preferably 30 to 80% by weight, in particular 35 to 70% by weight, of collagen dry matter, based on its total weight. The protein can be digested by the Kjeldahl process, in order to determine the total nitrogen content. The collagen content may be obtained by multiplication by the factor 5.55.

The concentrate has a solid consistency and a light-beige color, similar to parchment. By previous bleaching, for example treatment with about 1% strength by weight aqueous hydrogen peroxide solution, a purely white concentrate can also be obtained.

The concentrate is microbiologically stable, so that it is storable and transportable uncooled even over a relatively long time (at least 6 months). The micro-biological stability was studied not only by classical microbiological techniques (contact sampling, culturing on a nutrient medium and subsequent evaluation) but also by rapid tests (such as microarrays, ATP bioluminescence and gene probes). Even after 3, 4 and 6 months, the collagen concentrate according to the invention did not show any value-decreasing impairment by bacteria, yeasts or molds and was suitable without restrictions for producing food casings. The concentrate according to the invention, in dilution with water, has a pH of about 2.5 to 3.5. It additionally contains salts, in particular NaCl, which decrease the water activity, i.e. the $a_w$ value. These factors also contribute to the microbiological stability.

The production of collagen masses having a collagen fraction (calculated on the dry mass) of 3 to 15% by weight is known and described, for example, in U.S. Pat. Nos. 3,535,125 and 3,821,429. The starting material generally used is cattle or hog hides, wherein cattle hides are preferred. As described at the outset, the split hide is separated off, alkaline-digested and subsequently acidified. The resultant acidic (about pH 3), high water-content collagen mass is then concentrated. By addition of salts, such as sodium chloride, ammonium sulfate, sodium sulfate or ammonium chloride, if appropriate in combination with an elevation of the pH to about 3.5 to 7.0 which corresponds to the isoelectric range, the collagen fibers are precipitated out. The collagen fibers can also be precipitated out solely by adjusting the pH to a value within the abovementioned range. Finally, the collagen fibers can be precipitated out by addition of organic solvents, such as ethanol or acetone. In all cases, the collagen is subsequently pressed, for example in a filter press. Since the collagen fibers are relatively large (on average about 3 to 25 mm), a sieve plate or a coarse cloth is sufficient as filter. In this manner, from a filter press, a solid collagen concentrate may be obtained in the form of cuboids (plates) having a thickness of about 15 to 40 mm and a length and breadth each of up to several meters (preferably in each case 0.3 to 3 m). In this form it may very readily be stored and transported. In principle, the collagen concentrate can also be produced by freeze drying or drying in air.

By swelling with dilute aqueous acid, for example a dilute (about 0.5 to 2% strength by weight) aqueous acetic acid, from the concentrate coating masses can be produced which are suitable for the production of edible food casings. If the mass is extruded through an annular dye, seamless edible sausage casings may be obtained. Preferably, the casings are hardened after extrusion in order that they become more mechanically stable. This can be achieved, for example, by treatment with smoke or ammonia.

In addition, to the coating mass can be added conventional additives, for example cellulose fibers, dyes, pigments, inorganic and/or organic fillers.

The present invention accordingly also relates to a process for producing a food casing using the film-forming collagen concentrate. The process comprises the steps
(a) producing an aqueous collagen mass from animal hides or other animal sources;
(b) concentrating the aqueous collagen mass until it has a solids fraction of 18% by weight or more, preferably 25 to 95% by weight, particularly preferably 30 to 65% by weight, in each case based on the concentrate;
(c) admixing the concentrate with dilute aqueous inorganic and/or organic acid in order to obtain a collagen mass which is extrudable or castable;
(d) shaping the collagen mass from (c) to from a casing by a (co)extrusion or casting process;
(e) solidifying the casing and also,
(f) if appropriate, drying the casing.

The collagen mass is produced in step a) by processes with which a person skilled in the art is familiar in principle and are described many times in the prior art, e.g. in DE 32 03 957 C2. For example, the hide split described at the outset is treated for 3 days with a 2% strength aqueous KOH solution, subsequently for 30 min with cold water, three times with 10% strength aqueous sodium chloride solution and subsequently washed again with water. A pH of about 4 is then set using dilute hydrochloric acid. The material thus pretreated is then minced and diluted with water to a dry weight of about 6% by weight. The accompanying proteins and fat contained in addition to the collagen in the split hide are then substantially removed.

The aqueous collagen mass is concentrated, in particular, by expression of the water, for example in a filter press. The filter in this case can be relatively coarse. The mesh width of the filter is advantageously about 0.1 to 1.0 mm.

Freeze drying, in contrast, is associated with a higher energy consumption. In addition, the fraction of proteins having a lower molecular weight in the product is then higher than when the product is obtained using a filter press (having a wide-mesh filter).

Edible casings are preferably produced in a coextrusion process (step d)). Solidification of the collagen mass is then performed, for example, by treatment with liquid smoke or other chemical crosslinkers, by salt solutions having a dehydrating action or by increasing the pH up to the isoelectric range of the collagen (i.e. about pH 4 to 7), as described at the outset and known from the prior art.

Solidification of the casing (step e)) is performed, preferably, by chemical crosslinkers, for example using a cross-linking agent such as glutaraldehyde, glyoxal, liquid smoke, sugar or a mineral tanning agent. This agent can be previously mixed with the extrusion mass and/or be employed subsequently.

Food casings which are inedible may be obtained with paper, textile (woven fabric, knitted fabric, laid fabric, nonwoven felts, etc.) or another flat support is coated with the collagen mass. In the extrusion, the collagen mass can be applied to one or both sides of a flat support. The support is, for example, a—preferably wet-strength—fiber paper (in particular wet-strength hemp fiber paper) or a textile material (in particular a woven fabric, knitted fabric, laid fabric or a nonwoven felt).

If in the extrusion or coextrusion an annular dye is used, seamless tubular food casings may be obtained which are particularly readily suitable as artificial sausage casings.

The casing is expediently dried to a final moisture of 8 to 20% by weight, based on the total weight of the casing. In the case of overdrying, the desired moisture content may be established by spraying with water.

The food casing produced by the process according to the invention generally has a dry weight of 20 to 200 g/m$^2$, preferably 35 to 90 g/m$^2$. The concentrate according to the invention is used, in particular, in the production of artificial sausage casings, in particular edible sausage casings, i.e. casings which are suitable to be consumed as well. Such sausage casings are, with particular advantage, formed from a coextrusion mass produced from the concentrate simultaneously with the production of the sausage.

The examples hereinafter serve to illustrate the invention. Percentages therein are percentages by weight, unless stated otherwise or is clearly visible from the context.
Characterization of the Collagen Concentrates
Collagen Concentrate I (According to the Invention):
Collagen dry matter content (determined as specified above): 35.3%

A sample of the concentrate was dissolved or suspended in a 0.15 molar aqueous sodium dihydrogenphosphate buffer (buffer 1) adjusted to pH 7 until the solution contained 0.5%, by calculation, of collagen dry matter. The suspension was then stirred for 1 h at 500 rpm in a glass beaker at 20° C., wherein a macroscopically homogeneous mass was obtained. The suspension was then centrifuged at a relatively low speed of rotation (1780 RFC; 15° C.; 15 min), the supernatant was subsequently filtered through a sieve cloth having a mesh width of 60 μm, with application of reduced pressure. The filtrate was then filtered through a sieve cloth having a mesh width of 1.2 μm. The resultant filtrate was filtered again, this time through a sieve cloth having a mesh width of 0.45 μm. The sediment and also the filter residues from the individual filtrations were dried (1.5 h each at 40° C., at 60° C. and at 80° C., then for 16 h at 101° C.) and weighed. The weights of the individual fractions after drying are summarized in table 1 hereinafter.

The fractionation steps described were repeated on a further sample, but instead of an aqueous sodium dihydrogenphosphate buffer, use was made of a 0.15 molar aqueous ammonium carbonate buffer, likewise having a pH of 7 (buffer 2).

The fractionation steps were repeated again on a third sample, wherein, however, the pH had been adjusted to 3.5 by addition of acetic acid (buffer 3).

TABLE 1

|  | Buffer | | |
| --- | --- | --- | --- |
|  | 1 (pH 7) | 2 (pH 7) | 3 (pH 3.5) |
| Not centrifuged/unfiltered | 0.3528 g | 0.4502 g | 0.4502 g |
| Sediment after centrifugation (1780 RFC; 15° C.; 15 min) | 0.3386 g | 0.4146 g | 0.4012 g |
| Filter residue after filtration 60 μm | 0.0013 g | 0.0008 g | 0.0016 g |
| Filter residue after filtration 1.2 μm | 0.0072 g | 0.0011 g | 0.0151 g |
| Filter residue after filtration 0.45 μm | 0.0036 g | 0.0028 g | 0.0017 g |
| Filter residue after filtration 0.2 μm | 0.0002 g | 0.0004 g | 0.0039 g |

The supernatant after centrifugation accordingly comprised 3.48% of the collagen dry matter, whereas 96% of the collagen dry matter had a molecular weight so high that it could be separated off even by the relatively mild centrifugation.

More than 99.5% of the collagen could, as described, be separated off by centrifugation and filtration.

Collagen Concentrate II (According to the Invention):

Fraction of collagen dry matter (see above for determination): 29.2%

As shown in table 2, the fractionation is carried out in the same manner as with collagen concentrate I using the three different buffers specified there at two different pHs (pH 7 and pH 3.5).

TABLE 2

|  | Buffer | | |
| --- | --- | --- | --- |
|  | 1 (pH 7) | 2 (pH 7) | 3 (pH 3.5) |
| Not centrifuged/unfiltered | 0.2918 g | 0.3002 g | 0.3002 g |
| Sediment after centrifugation (1780 RFC; 15° C.; 15 min) | 0.2613 g | 0.2736 g | 0.2561 g |
| Filter residue after filtration 60 μm | 0.0042 g | 0.0012 g | 0.0018 g |
| Filter residue after filtration 1.2 μm | — | 0.0019 g | 0.0077 g |
| Filter residue after filtration 0.45 μm | — | 0.0008 g | 0.0189 g |
| Filter residue after filtration 0.2 μm | — | 0.0031 g | 0.0098 g |

By centrifugation under the specified conditions, 89.5% of the collagen could thereby be separated off.

By centrifugation and filtration (in this case up to a sieve size of 60 μm), 91% of the collagen could be separated off.

Example 1

From 5 kg of an extrusion mass which is produced in a conventional manner and based on cattle hide collagen, by addition of sodium chloride, collagen fibers were precipitated out. The collagen fibers were then expressed in a filter press until the collagen fraction (based on dry collagen) was 35%. The presscake which weighed about 1 kg could be stored in plastic barrels or bags at 20° C. for several months without any sign of decay.

In order therefrom to produce a (co)extrudable mass, 1 kg of the presscake was mixed with 4 kg of ice, 3 l of a 4% strength aqueous acetic acid and 15 g of a 80% strength aqueous lactic acid in a cutter for 5 min and subsequently homogenized. The pH of the mass was adjusted to 2.8 using dilute acetic acid.

Using a coextrusion device, as obtainable, for example, from Storck/Townsend Protecon, then a scaulded-emulsion sausage was produced in one step, which sausage was surrounded with a collagen casing formed in situ in the coextrusion. The casing was solidified by spraying with a liquid smoke solution. A natural acidic liquid smoke was used in this case.

A plurality of scaulded-emulsion sausages were then welded into a PE film bag and subsequently pasteurized (75° C.).

Example 2

As described in example 1, an extrusion mass was produced in a conventional manner, which extrusion mass was based on cattle hide collagen, from which collagen fibers were precipitated out by addition of NaCl. The collagen fibers were expressed in a filter press until a collagen dry matter of 60% was achieved. The resultant presscake was stored for 7 months at 20° C. in plastic barrels or bags. After 3, and also after 6, months, microbiological and food diagnostic examinations were carried out. These showed that the concentrate did not have any value-reducing impairments by bacteria, yeasts or molds and was suitable without restrictions for producing edible sausage casings.

The production of the coextrudable mass from the concentrate and also the production of the sausage were performed as described in example 1.

Example 3

From the collagen concentrate mentioned in example 1, an extrudable mass was produced as described. The mass was mixed with 0.8% by weight of cellulose fibers of a mean length of 300 to 700 μm and extruded in a wet-spinning process through a ring die to form a casing. The casing was solidified and dried in a known manner. It had a diameter of 21 mm at a wall thickness of 40 μm.

The properties of the sausage casing produced using the concentrate virtually do not differ from those of a casing produced in the "direct" pathway. The casing is particularly suitable for small sausages and Bratwurst. In addition, it was very readily smokeable, which is of importance in particular for small sausages.

That which is claimed:

1. Artificial sausage casing produced from a film-forming fractionated collagen concentrate that is insoluble in water, said collagen concentrate comprising at least 18% by weight of collagen dry matter, based on the total weight of the concentrate, wherein said collagen concentrate is protein having a molecular weight such that that at least 50% by weight of the protein of a homogeneous suspension produced from the concentrate in a 0.15 molar aqueous sodium dihydrogenphosphate buffer having a pH of 7 and a dry matter fraction of 0.5% by weight may be separated as sediment by 15 min centrifugation at 1780 RFC and 15° C.,
and said collagen concentrate is predominantly comprised of (i) precipitated, macroscopically visible collagen fibers and (ii) salt selected from sodium chloride, ammonium sulfate, sodium sulfate and ammonium chloride;
wherein a presscake consisting of said fractionated collagen and salt did not have any value reducing impairments by bacteria, yeasts or molds after storage for 3 months in a plastic bag at 20° C.

2. Artificial sausage casings as claimed in claim 1, wherein said casings are edible artificial sausage casings.

3. Artificial sausage casing as claimed in claim 1, wherein at least 60 to 92.5% by weight of the protein in the suspension may be separated off by centrifugation at 1780 RFC.

4. Artificial sausage casing as claimed in claim 1, wherein by centrifugation at 1780 RFC (15° C.; 15 min) and vacuum filtration through a sieve having a mesh width of 60 μm, at least 60% by weight to 95% by weight of the protein in the suspension may be separated off.

5. Artificial sausage casing as claimed in claim 1, wherein said collagen concentrate contains 60 to 95% by weight of dry matter, based on the total weight of the collagen concentrate.

6. Artificial sausage casing as claimed in claim 1, wherein said collagen concentrate contains 30 to 65% by weight of dry matter, based on the total weight of the collagen concentrate.

7. Artificial sausage casing as claimed in claim 1, wherein the length of the collagen fibers is 3 to 30 mm.

8. Artificial sausage casing as claimed in claim 1, wherein the length of the collagen fiber is 5 to 25 mm.

9. Artificial sausage casing as claimed in claim 1, wherein the length of the collagen fiber is 7.5 to 20 mm.

10. Artificial sausage casing as claimed in claim 1, wherein said film-forming collagen concentrate consists of cattle hide collagen.

11. A process for producing a food casing as claimed in claim 1 using a collagen concentrate, wherein the process comprises the following steps:
(a) producing an aqueous collagen mass from animal hides or other animal sources;
(b) concentrating the aqueous collagen mass until it has a solids fraction of 18% by weight or more, based on the weight of the concentrate;
(c) admixing the concentrate with water or dilute aqueous inorganic and/or organic acid in order to obtain a collagen mass which is extrudable or castable;
(d) shaping the collagen mass from (c) to from a casing by a (co)extrusion or casting process;
(e) solidifying the casing and, optionally,
(f) drying the casing.

12. The process as claimed in claim 11, wherein a filter press is used for the concentrating step b).

13. The process as claimed in claim 11, wherein, in step b) salts are added which precipitate out collagen fibers from the collagen mass.

14. The process as claimed in claim 11, wherein in step b) the pH is elevated to about 3.5 to 7.0.

15. The process as claimed in claim 11, wherein, in step b), an organic solvent or solvent mixture is mixed with the collagen mass in order to precipitate the collagen fibers out of the collagen mass.

16. The process as claimed in claim 11, wherein the collagen mass in step a) is additionally admixed with a bleaching agent.

17. The process as claimed in claim 11, wherein, in step c) the organic acid comprises lactic acid or acetic acid.

18. The process as claimed in claim 11, wherein step b) comprises concentrating the aqueous collagen mass until the collagen mass has a solids fraction of 25 to 80% by weight, based on the weight of the concentrate.

19. The process as claimed in claim 13, wherein, in step b), the salts are sodium chloride, ammonium sulfate, sodium sulfate or ammonium chloride.

20. The process as claimed in claim 16, wherein the bleaching agent is hydrogen peroxide.

21. A collagen concentrate consisting of (i) at least 18% by weight of collagen dry matter, based on the total weight of the concentrate, that is insoluble in water and predominantly comprised of precipitated collagen fibers in which at least 50% by weight of the protein has a molecular weight such that a homogeneous suspension produced from the concentrate in a 0.15 molar aqueous sodium dihydrogenphosphate buffer having a pH of 7 and a dry matter fraction of 0.5% by weight may be separated as sediment by 15 min centrifugation at 1780 RFC and 15° C. and (ii) salt,
said collagen concentrate further having a pH of 2.5 to 3.5 and microbiological stability at room temperature for at least 6 months.

22. A collage concentrate as claimed in claim 21, wherein the collagen concentrate is a presscake in the shape of a cuboid having a thickness of 15 to 40 mm and a length and width each of 0.3 to 3 m.

23. A collagen concentrate as claimed in claim 21, wherein said salt is sodium chloride, sodium sulfate or ammonium chloride.

24. An collagen concentrate as claimed in claim 21, wherein said collagen concentrate contains 60 to 95% by weight of dry matter, based on the total weight of the collagen concentrate.

* * * * *